US012808680B1

(12) United States Patent
Yu et al.

(10) Patent No.: US 12,808,680 B1
(45) Date of Patent: Nov. 24, 2026

(54) STATION AND EVSE LOCATION EXTRACTION USING VEHICLE LOCATION

(71) Applicant: Ford Global Technologies, LLC, Dearborn, MI (US)

(72) Inventors: Su Yu, Troy, MI (US); Kai Wu, Pittsburgh, PA (US); Narendran C, Chennai (IN); Jeffrey James Beno, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/233,647

(22) Filed: Jun. 10, 2025

(51) Int. Cl.
*G01C 21/36* (2006.01)
*B60L 53/67* (2019.01)
(Continued)

(52) U.S. Cl.
CPC .......... *G01C 21/3679* (2013.01); *B60L 53/67* (2019.02); *G01C 21/3446* (2013.01); *G01C 21/3469* (2013.01); *H04L 61/09* (2022.05)

(58) Field of Classification Search
CPC ............ G01C 21/3679; G01C 21/3446; G01C 21/3469; G01C 21/3682; H04L 61/09;
(Continued)

(56) References Cited

U.S. PATENT DOCUMENTS

| | | | | |
|---|---|---|---|---|
| 5,790,976 A * | 8/1998 | Boll | B60L 3/12 701/25 |
| 10,360,519 B2 | 7/2019 | Mu et al. | |

(Continued)

FOREIGN PATENT DOCUMENTS

| | | |
|---|---|---|
| CN | 103891319 A | 6/2014 |
| WO | 2013053394 A1 | 4/2013 |
| WO | 2024033082 A1 | 2/2024 |

OTHER PUBLICATIONS

Cocca et al., "Free Floating Electric Car Sharing: A Data Driven Approach for System Design", IEEE Transactions on Intelligent Transportation Systems, Dec. 2019, 13 pages, vol. 20, No. 12.

(Continued)

*Primary Examiner* — George C Jin

(74) *Attorney, Agent, or Firm* — Joseph Zane; Brooks Kushman P.C.

(57) ABSTRACT

Precise geographic locations of electric vehicle supply equipment (EVSE) at charging stations are determined. Connected vehicle charger data is received from a plurality of vehicles. The connected vehicle charger data includes vehicle global navigation satellite system (GNSS) locations during charging events, EVSE identifiers of EVSEs connected to the vehicles during the charging events, and plug-in and plug-out times of the charging events. The charging events are mapped to the EVSEs of the charging stations. For each of the EVSEs, EVSE locations are extracted as EVSE centroids of clustered vehicle GNSS locations of the charging events mapped to the EVSE. For each of the charging stations, corrected charging station locations are extracted as charging station centroids of clustered vehicle GNSS locations for each charging station. The corrected charging station locations and the EVSE locations are provided for use in vehicle navigation.

20 Claims, 9 Drawing Sheets

(51) Int. Cl.
*G01C 21/34* (2006.01)
*H04L 61/09* (2022.01)

(58) Field of Classification Search
CPC .. B60L 53/60; B60L 2240/72; B60L 2240/60; B60L 53/67
See application file for complete search history.

(56) References Cited

U.S. PATENT DOCUMENTS

| | | | | |
|---|---|---|---|---|
| 2010/0106414 | A1* | 4/2010 | Whitehead | G01C 21/3484 701/469 |
| 2011/0140656 | A1 | 6/2011 | Starr et al. | |
| 2014/0132767 | A1 | 5/2014 | Sonnabend et al. | |
| 2015/0018011 | A1 | 1/2015 | Mendelson | |
| 2019/0271550 | A1 | 9/2019 | Breed et al. | |
| 2019/0383637 | A1* | 12/2019 | Teske | G01C 21/3676 |
| 2023/0028206 | A1 | 1/2023 | Quint et al. | |
| 2023/0409561 | A1* | 12/2023 | Gronowski | B60L 53/66 |
| 2024/0027214 | A1* | 1/2024 | Yang | G01C 21/3469 |
| 2024/0051422 | A1* | 2/2024 | Kim | B60L 53/67 |
| 2024/0160871 | A1 | 5/2024 | Kovarik et al. | |
| 2024/0246437 | A1 | 7/2024 | McCool et al. | |
| 2024/0294088 | A1 | 9/2024 | Wu et al. | |
| 2024/0361137 | A1 | 10/2024 | Aviv et al. | |

OTHER PUBLICATIONS

Fu et al., "Optimization of Freight Charging Infrastructure Placement Using Multiday Travel Data", 2023 IEEE 26th International Conference on Transportation Systems (ITSC), Sep. 2023, 7 pages.
Furgale et al., "Toward Automated Driving in Cities Using Close-to-Market Sensors", 2013 IEEE Intelligent Vehicles Symposium (IV), 2013, 8 pages.
Qian et al., "Behavior-Driven Planning of Electric Truck Charging Infrastructure for Intercity Operations", IEEE Transactions on Intelligent Transportation Systems, Sep. 2024, 17 pages, vol. 25, No. 9.
Vijayashanthi et al., "Smart EV-Hub: A Smart Development of an Internet of Things Based Electric Vehicle Charging Station Using Artificial Intelligence", 2024 International Conference on Advances in Computing, Communication and Applied Informatics, 2024, 6 pages.
Zinnari et al., "Electrification Potential of Fuel-Based Vehicles and Optimal Placing of Charging Infrastructure: A Large-Scale Vehicle—Telematics Approach", IEEE Transactions on Transporation Electrification, Mar. 2022, 14 pages, vol. 8, No. 1.
Bayram et al., "Could Petrol Stations Play a Key Role in Transportation Electrification? A GIS-Based Coverage Maximization of Fast EV Chargers in Urban Environment", IEEE Access, 2022, 12 pages, vol. 10
Scanning the Issue, IEEE Transactions of Intelligent Transportation Systems, Jul. 2022, 47 pages, vol. 23, No. 7.
Ma et al., "Exploring Communication Technologies, Standards, and Challenges in Electrified Vehicle Charging", arXiv:2403.16830v1, Mar. 25, 2024, 18 pages.
Magsino et al., "Discovering Electric Vehicle Charging Locations Based on Clustering Techniques Applied to Vehicular Mobility Datasets", International Journal of Geo-Information, 2024, 19 pages, vol. 13, No. 368
Foster, "New Ways to Power Up Your Electric Vehicle Adventures With Google Maps", Apr. 17, 2024, 7 pages.
Radermecker et al., "Estimation of Public Charging Demand Using Cellphone Data and Points of Interest-Based Segmentation", 35th International Electric Vehicle Symposium and Exhibition (EVS35), 2022, 16 pages.

* cited by examiner

200

400

500C

500D

600

STATION AND EVSE LOCATION EXTRACTION USING VEHICLE LOCATION

TECHNICAL FIELD

Aspects of the disclosure generally relate to accurate extraction of charging station location and electric vehicle supply equipment (EVSE) location using data-driven techniques.

BACKGROUND

EVSEs refers to the infrastructure and devices used to deliver electrical energy from the power grid to an electric vehicle (EV) for the purpose of recharging its battery. EVSE includes components such as connectors, cables, communication protocols, and mechanisms that provide a flow of electricity and ensure secure and efficient charging. Wait times for use of EVSEs can vary significantly depending on factors such as charger type, charging speed, and station availability.

SUMMARY

In one or more illustrative examples, a method for determining precise geographic locations of electric vehicle supply equipment (EVSE) at charging stations, includes receiving connected vehicle charger data from a plurality of vehicles, the connected vehicle charger data including vehicle global navigation satellite system (GNSS) locations during charging events, EVSE identifiers of EVSEs connected to the vehicles during the charging events, and plug-in and plug-out times of the charging events; mapping the charging events to the EVSEs of the charging stations; for each of the EVSEs, extracting EVSE locations as EVSE centroids of clustered vehicle GNSS locations of the charging events mapped to the EVSE; for each of the charging stations, extracting corrected charging station locations as charging station centroids of clustered vehicle GNSS locations for each charging station; and providing the corrected charging station locations and the EVSE locations for use in vehicle navigation.

In one or more illustrative examples, the method further includes mapping the charging events to the EVSEs of the charging station using an EVSE-to-MAC address mapping and the EVSE identifiers of EVSEs connected to the vehicles during the charging events; receiving dynamic charger history data for a plurality of EVSEs, the dynamic charger history data including status of each of the EVSEs over time and usage events of each of the EVSEs; and for the charging events that do not map to the EVSEs using the EVSE-to-MAC address mapping, mapping the charging events to the EVSEs by matching the status of the EVSE over time to the plug-in and plug-out times of the charging events.

In one or more illustrative examples, the method further includes receiving charging station location data including initial GNSS coordinates of charging stations; and mapping the charging events to the charging station using the vehicle GNSS locations within a predefined distance from the initial GNSS coordinates of charging stations.

In one or more illustrative examples, the method further includes performing a first clustering the vehicle GNSS locations of the charging events mapped to the EVSE using a density-based spatial clustering of applications with noise (DBSCAN) algorithm; performing a second clustering the vehicle GNSS locations of the charging events mapped to the charging station using the DBSCAN algorithm; and discarding any vehicle GNSS locations identified as outliers by the DBSCAN algorithm before calculating the EVSE centroids and the charging station centroids.

In one or more illustrative examples, a first minimum threshold number of charge events is required for estimating each EVSE location, and a second minimum threshold number of charge events is required for estimating each charging station location.

In one or more illustrative examples, the method further includes filtering the connected vehicle charger data to include only charging events within a predefined recent time window prior to performing the first and second clusterings.

In one or more illustrative examples, the method further includes merging consecutive charging sessions by a same vehicle at a same EVSE prior to clustering.

In one or more illustrative examples, the method further includes receiving a charger request from a vehicle including a location and/or destination of the vehicle; and sending a charger recommendation to the vehicle, the charger recommendation including a recommended charging station location of one of the charging stations and a recommended EVSE location of a recommended one of the EVSEs.

In one or more illustrative examples, a system for determining precise geographic locations of electric vehicle supply equipment (EVSE) at charging stations, comprising a memory configured to store connected vehicle charger data from a plurality of vehicles, the connected vehicle charger data including vehicle global navigation satellite system (GNSS) locations during charging events, EVSE identifiers of EVSEs connected to the vehicles during the charging events, and plug-in and plug-out times of the charging events; and one or more processors, configured to map the charging events to the EVSEs of the charging stations, for each of the EVSEs, extract EVSE locations as EVSE centroids of clustered vehicle GNSS locations of the charging events mapped to the EVSE, for each of the charging stations, extract corrected charging station locations as charging station centroids of clustered vehicle GNSS locations for each charging station, and provide the corrected charging station locations and the EVSE locations for use in vehicle navigation.

In one or more illustrative examples, the memory is further configured to store dynamic charger history data for a plurality of EVSEs, the dynamic charger history data including status of each of the EVSEs over time and usage events of each of the EVSEs; and wherein one or more one or more processors are further configured to: map the charging events to the EVSEs of the charging station using an EVSE-to-MAC address mapping and the EVSE identifiers of EVSEs connected to the vehicles during the charging events; and for the charging events that do not map to the EVSEs using the EVSE-to-MAC address mapping, map the charging events to the EVSEs by matching the status of the EVSE over time to the plug-in and plug-out times of the charging events.

In one or more illustrative examples, the memory is further configured to store charging station location data including initial GNSS coordinates of charging stations; and wherein one or more one or more processors are further configured to map the charging events to the charging station using the vehicle GNSS locations within a predefined distance from the initial GNSS coordinates of charging stations.

In one or more illustrative examples, the one or more processors are further configured to perform a first clustering the vehicle GNSS locations of the charging events mapped to the EVSE using a density-based spatial clustering of applications with noise (DBSCAN) algorithm; perform a second clustering the vehicle GNSS locations of the charging events mapped to the charging station using the DBSCAN algorithm; and discarding any vehicle GNSS locations identified as outliers by the DBSCAN algorithm before calculating the EVSE centroids and the charging station centroids.

In one or more illustrative examples, a first minimum threshold number of charge events is required for estimating each EVSE location, and a second minimum threshold number of charge events is required for estimating each charging station location.

In one or more illustrative examples, the one or more processors are further configured to filter the connected vehicle charger data to include only charging events within a predefined recent time window prior to performing the first and second clusterings.

In one or more illustrative examples, the one or more processors are further configured to merge consecutive charging sessions by a same vehicle at a same EVSE prior to clustering.

In one or more illustrative examples, the one or more processors are further configured to receive a charger request from a vehicle including a location and/or destination of the vehicle; and send a charger recommendation to the vehicle, the charger recommendation including a recommended charging station location of one of the charging stations and a recommended EVSE location of a recommended one of the EVSEs.

In one or more illustrative examples, a non-transitory computer-readable medium includes instructions for determining precise geographic locations of electric vehicle supply equipment (EVSE) at charging stations that, when executed by one or more processors, causes the one or more processors to perform operations including to receive connected vehicle charger data from a plurality of vehicles, the connected vehicle charger data including vehicle global navigation satellite system (GNSS) locations during charging events, EVSE identifiers of EVSEs connected to the vehicles during the charging events, and plug-in and plug-out times of the charging events; map the charging events to the EVSEs of the charging stations; for each of the EVSEs, extract EVSE locations as EVSE centroids of clustered vehicle GNSS locations of the charging events mapped to the EVSE; for each of the charging stations, extract corrected charging station locations as charging station centroids of clustered vehicle GNSS locations for each charging station; and provide the corrected charging station locations and the EVSE locations for use in vehicle navigation.

In one or more illustrative examples, the non-transitory computer-readable medium further includes instructions that, when executed by the one or more processors, causes the one or more processors to perform operations including to map the charging events to the EVSEs of the charging station using an EVSE-to-MAC address mapping and the EVSE identifiers of EVSEs connected to the vehicles during the charging events; receive dynamic charger history data for a plurality of EVSEs, the dynamic charger history data including status of each of the EVSEs over time and usage events of each of the EVSEs; for the charging events that do not map to the EVSEs using the EVSE-to-MAC address mapping, mapping the charging events to the EVSEs by matching the status of the EVSE over time to the plug-in and plug-out times of the charging events; receive charging station location data including initial GNSS coordinates of charging stations; and map the charging events to the charging station using the vehicle GNSS locations within a predefined distance from the initial GNSS coordinates of charging stations.

In one or more illustrative examples, the non-transitory computer-readable medium further includes instructions that, when executed by the one or more processors, causes the one or more processors to perform operations including to perform a first clustering the vehicle GNSS locations of the charging events mapped to the EVSE using a density-based spatial clustering of applications with noise (DBSCAN) algorithm; perform a second clustering the vehicle GNSS locations of the charging events mapped to the charging station using the DBSCAN algorithm; and discard any vehicle GNSS locations identified as outliers by the DBSCAN algorithm before calculating the EVSE centroids and the charging station centroids, wherein a first minimum threshold number of charge events is required for estimating each EVSE location, and a second minimum threshold number of charge events is required for estimating each charging station location.

In one or more illustrative examples, the non-transitory computer-readable medium further includes instructions that, when executed by the one or more processors, causes the one or more processors to perform operations including to: receive a charger request from a vehicle including a location and/or destination of the vehicle; and send a charger recommendation to the vehicle, the charger recommendation including a recommended charging station location of one of the charging stations and a recommended EVSE location of a recommended one of the EVSEs.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Two drawbacks currently hinder the customer charging experience in EV charging infrastructure: inaccurate global navigation satellite system (GNSS) locations for charging stations and a lack of GNSS coordinates for individual EVSEs located at the charging stations.

Aspects of the disclosure improve the charging experience by using connected vehicle data to determine precise locations of the charging stations and the EVSEs. The approach includes mapping charging events, where vehicle charging events are mapped to charging stations using an initial station GNSS coordinate provided by various data sources. The approach further includes GNSS location extraction, where charging station and EVSE GNSS locations are extracted as centroids of vehicle GNSS data from charging events. Noise and outliers are removed, e.g., using the density-based spatial clustering of applications with noise (DBSCAN) algorithm.

Once determined, these precise charging station may be provided to EVs. These locations may be used to improved navigation, relieving the frustration of searching for inaccurately located charging stations. Moreover, precise the EVSE locations may support advanced technologies (such as automated parking) by enabling vehicles to navigate directly to an available EVSE of the charging station. This enhanced navigation saves customers time and reduces confusion during charging station visits.

Other benefits may also be achieved beyond customer navigation. For instance, enhanced downstream analytics become possible, because the more accurate GNSS data enables correct mapping of vehicle charging events to infrastructure, which in turn improves analysis of charging station and charger performance. Also, the EVSE locations may enhance map-based interfaces that visually depict individual EVSE locations within parking areas, along with availability and reliability information. Further aspects of the disclosure are discussed in detail herein.

Figure 1:
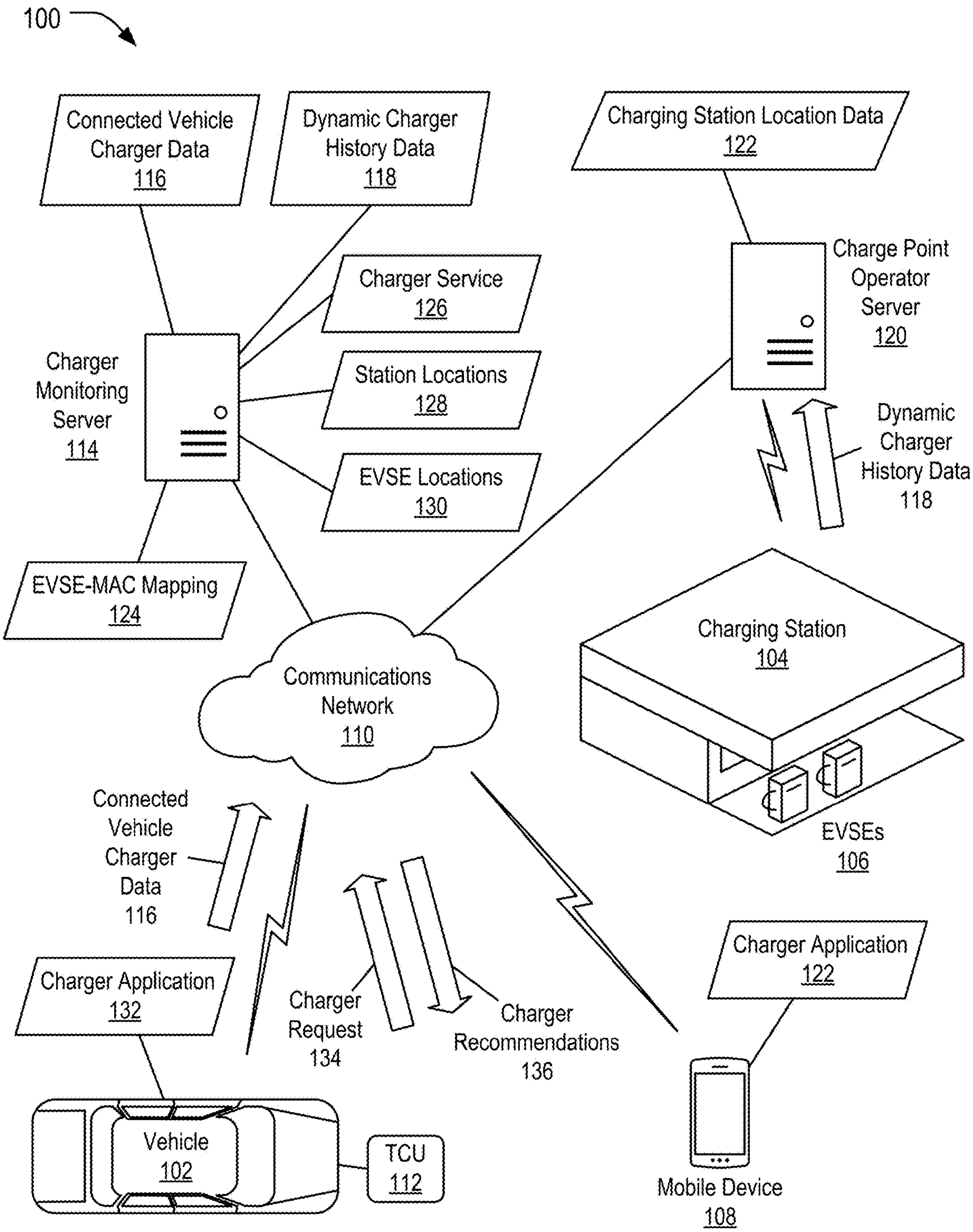
FIG. 1 illustrates an example system for performing location for vehicles navigating to charging stations and EVSEs.

FIG. 1 illustrates an example system 100 for performing location estimation for vehicles 102 navigating to charging stations 104 and EVSEs 106. The EVSEs 106, mobile devices 108, telematics control units (TCUs) 112 of the vehicles 102, and charger monitoring server 114 may be configured to communicate over a communications network 110. The charger monitoring server 114 may be configured to receive connected vehicle charger data 116 from the vehicles 102 and dynamic charger history data 118 from the EVSEs 106. The charger monitoring server 114 may also receive or have access to a charge point operator (CPO) server 120 maintaining charging station location data 122. Using the connected vehicle charger data 116, dynamic charger history data 118, and an EVSE-MAC mapping 124, a charger service 126 hosted by the charger monitoring server 114 may be configured to estimate corrected charging station locations 128 and estimate EVSE locations 130. The charging station locations 128 and EVSE locations 130 may be used to handle charger requests 134 to provide charger recommendations 136 directing the vehicles 102 to the locations of the charging stations 104 and/or EVSEs 106 located at the charging stations 104. It should be noted that the system 100 is only an example, and examples with more, fewer, or differently located components may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be a battery electric vehicle (BEV) powered by a traction battery and one or more electric motors. As a further possibility, the vehicle 102 may be a hybrid electric vehicle powered by both an engine, a traction battery, and one or more electric motors. Hybrid vehicles 102 may come in various forms, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs) e.g., in accordance with International Organization for Standardization (ISO) standard 3779, globally unique identifiers (GUIDs), customer or fleet accounts, etc.

The charging stations 104 may include one or more EVSEs 106. The EVSEs 106 may be configured to manage the transfer of energy between a power source and the vehicle 102. An external power source may provide direct current (DC) or alternating current (AC) electric power to the EVSEs 106. The EVSEs 106 may, in turn, have a charge connector for plugging into a respective charge port of the vehicle 102. The charge port may be any type of port configured to transfer power from the EVSEs 106 to the vehicle 102. Alternatively, the EVSEs 106 may be configured to transfer power using other approaches, such as a wireless inductive coupling. However connected, the EVSEs 106 may include circuitry and controls to manage the transfer of energy between the power source and the vehicle 102.

The mobile device 108 may be any of various types of portable computing device, such as cellular phones, tablet computers, smart watches, laptop computers, portable music players, or other devices having processing and communications capabilities. The mobile device 108 may include one or more processors configured to execute computer instructions, and a storage medium on which the computer-executable instructions and/or data may be maintained.

The mobile device 108 may further include various wireless transceivers, such as a BLUETOOTH or BLUETOOTH Low Energy (BLE) transceiver, as well as a transceiver for communication over the communications network 110. The communications network 110 may include one or more interconnected communication networks such as the Internet, a cable television distribution network, a satellite link network, a local area network, and a telephone network, as some non-limiting examples. The vehicle 102 may also include a telematics control unit (TCU) 112. The TCU 112 may include network hardware configured to facilitate communication between the vehicle 102 and other devices of the system 100. For example, the TCU 112 may include or otherwise access a cellular modem configured to facilitate communication with the communications network 110.

The charger monitoring server 114 may be an example of a networked computing device that is accessible to the vehicles 102, EVSEs 106, and/or mobile devices 108 over the communications network 110. The charger monitoring server 114 may be configured to receive the connected vehicle charger data 116 over the over the communications network 110 from the vehicles 102 (e.g., periodically, responsive to charge completions, responsive to occurrence of predefined events on the vehicle 102, etc.). The charger monitoring server 114 may also be configured to receive dynamic charger history data 118 from CPO server 120 in communication with the EVSEs 106 (e.g., as part of a billing process for EVSEs 106 usage or as a separate process). In another example, the EVSEs 106 may monitor their own usage, and may send the dynamic charger history data 118 over the over the communications network 110 to the charger monitoring server 114.

The connected vehicle charger data 116 may include usage information about the vehicle 102. This usage information may include, for example: identifiers (IDs) of the vehicles 102 such as VIN, the locations of the vehicle 102 when charging and/or over time, plug in times when the vehicle 102 was connected to an EVSE 106, plug out times when the vehicle 102 was disconnected from the EVSE 106, change in state of charge (ΔSoC) for the charge event with the EVSE 106, and a media access control (MAC) address (such as defined in Institute of Electrical and Electronics Engineer (IEEE) 802 local area network (LAN) standards) or another identifier of the EVSE 106 to which the vehicle 102 was plugged in and plugged out. It should be noted that MAC address is used in many examples herein, but another unique network identifier, serial number, or other identifier of the EVSEs 106 may alternately be used.

The dynamic charger history data 118 may include information with respect to vehicle 102 usage of the EVSEs 106. This information may include, as some non-limiting examples: an ID of the EVSE 106 (e.g., MAC address) and status of the EVSE 106 over time (e.g., charging, available, out-of-order, etc.). The dynamic charger history data 118 may include various details, such as: a time at which an EVSE 106 begins to charge a vehicle 102, a time at which an EVSE 106 stops to charging the vehicle 102, average charge rate for the charge of the vehicle 102, charge over time rate for the charge of the vehicle 102, an identifier of the vehicle 102, whether an issue occurred during the charge of the vehicle 102, expense per kWh for the charge, etc. The dynamic charger history data 118 may also include information regarding the vehicles 102 that utilize the EVSEs 106. For instance, the dynamic charger history data 118 may also include identifiers of the vehicles 102 (e.g., VIN, GUID, user account, etc.), make, model, and/or type of the vehicle 102, age of the vehicle 102, battery health of the vehicle 102, mileage of the vehicle 102, initial charge level of the vehicle 102, ending charge level of the vehicle 102.

The CPO server 120 may be another example of a networked computing device that is accessible to the charger monitoring server 114 over the communications network 110. Among other things, the CPO server 120 may make various data about the charging stations 104 available for use in various tasks, such as the charging station location data 122.

The charging station location data 122 may include information about the locations of the charging stations 104. This may include information such as ID of the charging station 104, ID of the EVSE 106 (e.g., consistent with the dynamic charger history data 118), and GNSS locations of the charging stations 104 (sometimes referred to herein as provided station locations).

The EVSE-MAC mapping 124 refers to data correlating identifiers of the EVSEs 106 to MAC addresses that are captured by the vehicles 102 in the connected vehicle charger data 116. Assuming that the CPO server 120 does not randomize the MAC address for each EVSE 106, the charging EVSE 106 may be identified using the MAC address that vehicle 102 receives when performing a charge event. The EVSE-MAC mapping 124 may include information such as: ID of the charging station 104, ID of the EVSE 106, MAC address of the EVSE 106, and effective first and last dates of the MAC address, e.g., if the MAC address is updated (which may indicate a hardware update).

The charger service 126 may be an example of an application executed by the charger monitoring server 114. As explained in further detail herein, the charger service 126 may be configured to receive the connected vehicle charger data 116, the dynamic charger history data 118, and the charging station location data 122. Using the information the charger service 126 may estimate charging station locations 128 and EVSE locations 130. These estimated charging station locations 128 and EVSE locations 130 may be used to for various end tasks, such as to accurately route the vehicles 102 for charging. In an example, the charging station locations 128 and/or EVSE locations 130 may be used to reply to charger requests 134 with charger recommendations 136 tailored to the vehicle 102 to be charged (e.g., with the best timing).

Figure 2:
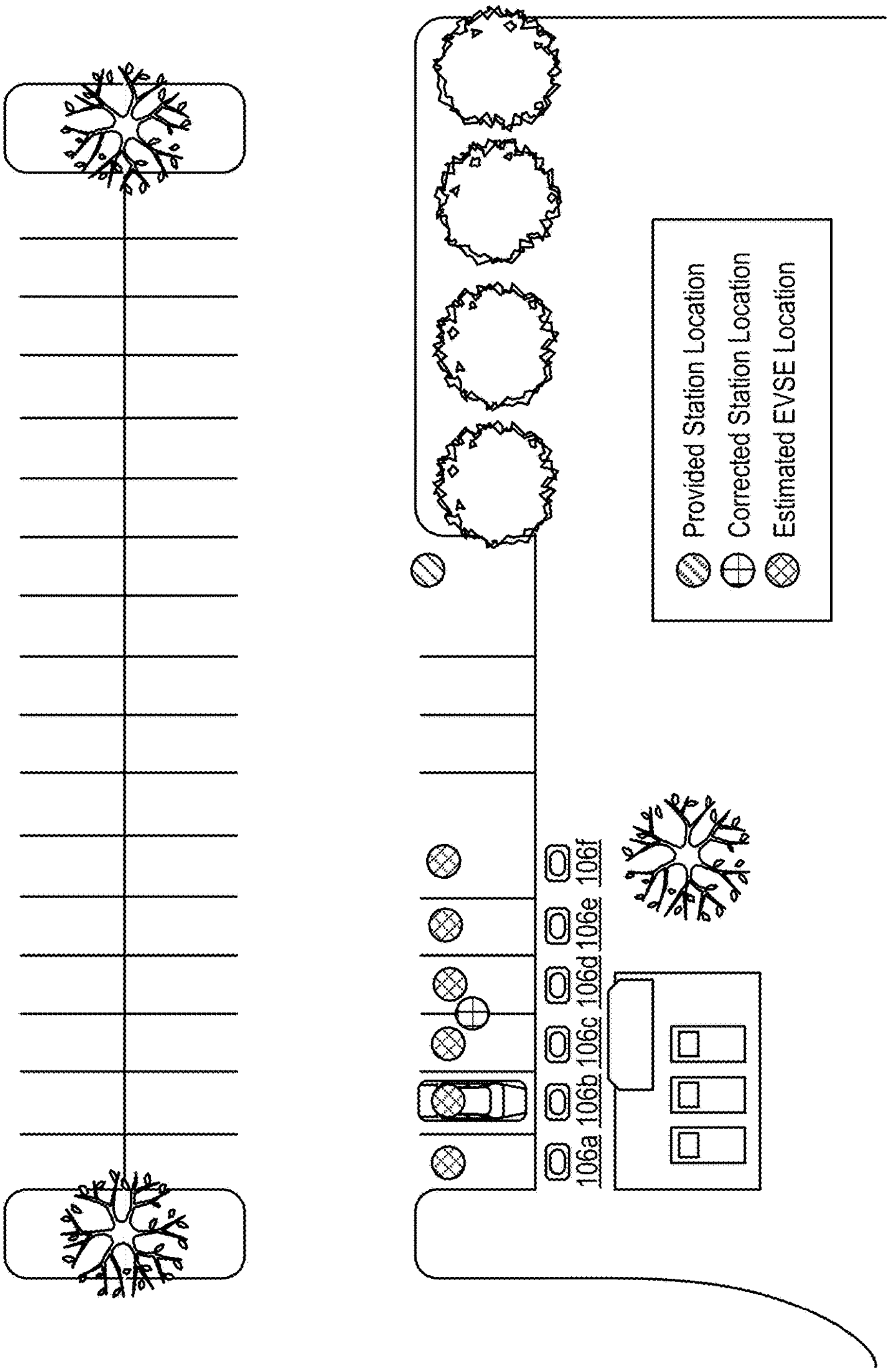
FIG. 2 illustrates an example overhead view of a charging station having six EVSEs.

FIG. 2 illustrates an example overhead view 200 of a charging station 104 having six EVSEs 106. As shown, data for the charging station 104 shows a provided station location determined from the charging station location data 122 that is many parking spots away from the actual location of the charging station 104.

The GNSS coordinates of the provided station locations often varies across different CPO servers 120, ranging from several meters to hundreds of meters. This inaccuracy and inconsistency may be due to various reasons. For example, when adding new charging stations 104 to their database, operators might input incorrect coordinates or address information. As another possibility, the charging stations 104 street address may direct users to the front of a building, while the actual EVSEs 106 are located around the side or back of the building. As yet another possibility, as a charging station 104 expands and changes, operators may fail to update their databases with the latest location data for the charging station 104. Still other issues may occur because charging point operators sometimes rely on information provided by property owners or local authorities, which may not always be accurate.

In addition to inaccurate provided station locations, many CPO servers 120 do not provide GNSS coordinates for individual EVSEs 106. For example, the illustrated charging station 104 has six EVSEs 106 located in six different parking spaces, yet only one GNSS coordinate is provided for the entire charging station 104.

The issues of inaccurate charging station 104 locations and lack of EVSE-level GNSS data represent common geospatial data quality issues stemming from the inherent limitations of single-point GNSS measurements. Assuming unbiased GNSS measurements, location variance may be significantly reduced through averaging multiple measurements.

In the context of public EV charging, each GNSS location of a vehicle 102 during a charging event may be considered a single measurement of the location of the EVSE 106 charging the vehicle 102. By using the connected vehicle charger data 116 and dynamic charger history data 118 from numerous charging events, the system 100 can improve the accuracy of charging station 104 coordinates and estimate the GNSS locations of individual EVSEs 106.

Let:

$X=(\text{lat, lon})_{EVSE}$ be the true GNSS location of a vehicle 102 charging at an EVSE 106, $X_i=(\text{lat, lon})_{vehicle}$ be the reported GNSS location of the vehicle 102 charging of a charge visit at the matching EVSE 106, And define:

$\bar{X}_n$ as the geospatial centroid of a cluster of n GNSS locations of vehicles 102 (e.g., all n charge visits to the same EVSE 106).

Assuming the measurement is unbiased, or $$E(X_i) = X$$

Then according to Central Limit Theorem, the distance between true charging location at the EVSE 106 and geometric centroid of GNSS location of the vehicle 102, or $|\bar{X}_n - X|$, follow:

$$\frac{|\bar{X}_n - X|}{\frac{s_n}{\sqrt{n}}} \sim T_{n-1}$$

Where:

$s_n$ is sample standard deviation;

n is number of charge visits;

$T_{n-1}$ is t-distribution with (n−1) degree of freedom; and

The result is the geospatial distance between true charging location at the EVSE 106 and geometric centroid of GNSS location of the vehicle 102.

The Central Limit Theorem proves that the distance between measured centroid of GNSS locations of the vehicles 102 and true charging location at the EVSE 106 can be reduced from repeated measurements. This distance is inversely proportional to square root of number of measurements, e.g., n. This may be shown as follows, and may be used to correct locations of the charging stations 104:

$$|\bar{X}_n - X| \propto \frac{1}{\sqrt{n}}$$

Figure 3:
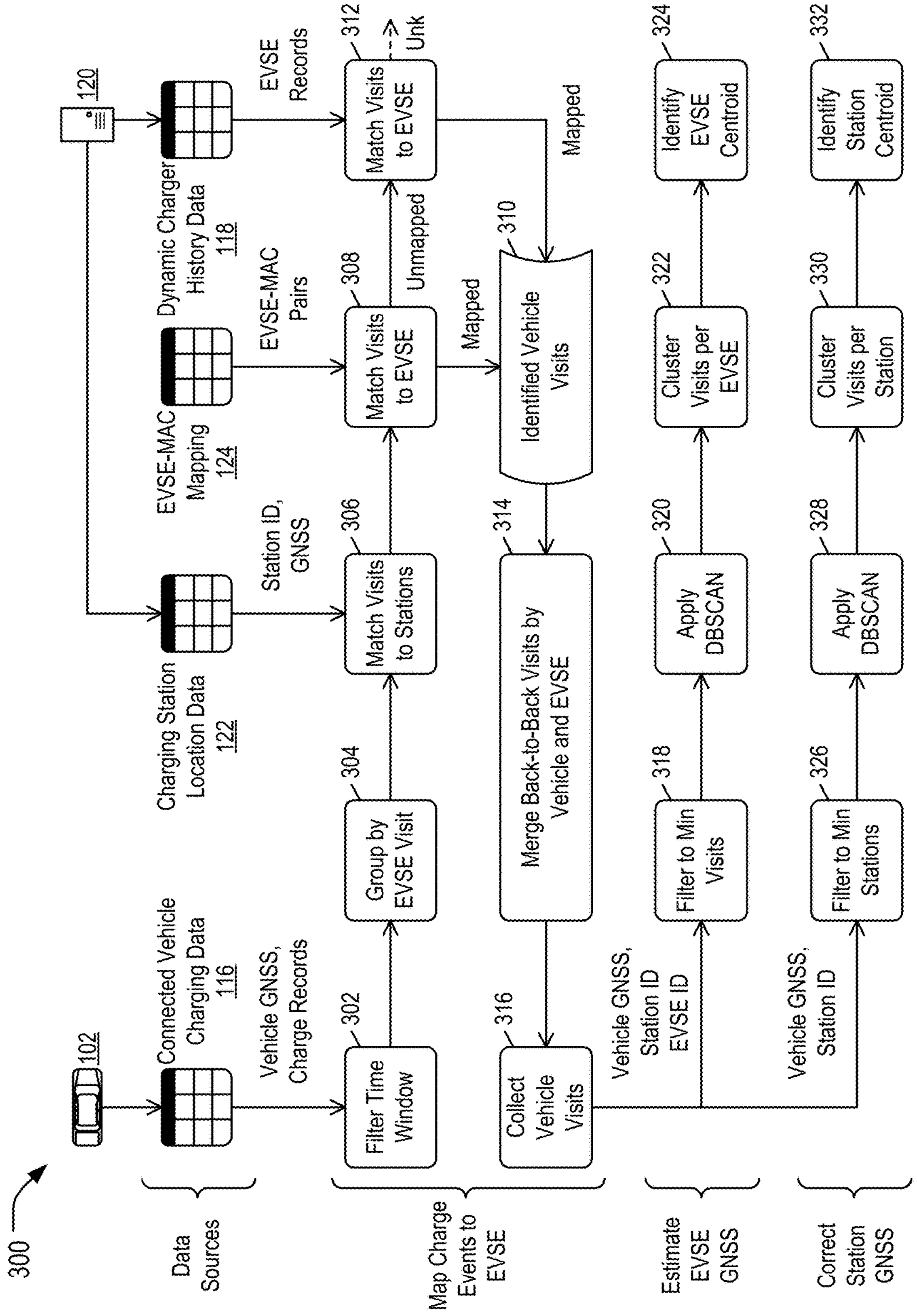
FIG. 3 illustrates an example workflow diagram of the operation of the charger service.

FIG. 3 illustrates an example workflow 300 of the operation of the charger service 126. As shown, the charger service 126 utilizes various data sources, including the connected vehicle charger data 116, the dynamic charger history data 118, the charging station location data 122, and the EVSE-MAC mapping 124. Using these data sources, the charger service 126 maps charge events to EVSEs 106. Moreover, the charger service 126 applies the DBSCAN algorithm to remove noise and outliers, and then extracts charging station locations 128 and the EVSE locations 130 as centroids of the charge visits.

More specifically, using the connected vehicle charger data 116 from the vehicles 102, GNSS locations of vehicles 102 at charge events are extracted. As shown at operation 302, this information may be filtered to a specific time window for analysis. In an example, the time window may be the most recent 90-day timeframe, but other periods of time having sufficient charge events may be used. For example, this timeframe may be adjusted to balance data recency and volume.

At operation 304, the filtered vehicle charge sessions from connected vehicle charger data 116 is grouped to EVSE visits, in case of consecutive attempts. The consecutive charge attempts may refer to consecutive plug events, e.g., within a predefined time window from one another, to the same EVSE. This may be done because such multiple plug events may actually be a single attempt to charge the vehicle 102. The multiple plug events may be caused by a failed or incomplete charge session followed by a second charge session, for example. Consecutive charge attempts to the same EVSE may be identified when vehicle charge records 302 by the one vehicle exhibit the same odometer reading, the same vehicle GNSS location, with short gap times between the previous plug-out time and the next plug-back-in time, and with no signal of vehicle motion. Charging records from these consecutive charge attempts are grouped as one EVSE visit, assuming all charge sessions by this vehicle are performed at the same EVSE. This grouping can be validated by vehicles 102 receiving no more than one unique, not-randomized EVSE MAC address 106 from back-to-back charge sessions. Some possible scenarios are the vehicle 102 receives the same EVSE MAC address in both charge sessions, or the vehicle 102 receives an EVSE MAC address from the latter charge session but does not receive an EVSE MAC address from the former charge session due to communication failures.

At operation 306, the vehicle 102 charge visits are matched to charging stations 104 using the charging station location data 122. In an example station IDs and GNSS locations of the charging stations 104 are matches to the GNSS locations of the vehicles 102 in the connected vehicle charger data 116. This may be accomplished using a predefined GNSS distance threshold (e.g., 30 meters or some other relevant value).

At operation 308, the vehicle 102 charge visits having been matched to the charging stations 104 are further matched to the individual EVSE 106 of the matched charging stations 104. For example, the EVSE-MAC mapping 124 may be used to look up the MAC address of the EVSE 106 for the charge visit. If the EVSE-MAC mapping 124 includes a corresponding ID of the EVSE 106, then this identifier may be correlated with the charge visit and added a data set of identified vehicle-charger visits 310.

For those charge visits that are not mapped, the charger service 126 proceeds to operation 312, where an alternate approach to mapping is performed by timing instead of by MAC address. Here, the dynamic charger history data 118 is used to locate start times and end times of charging sessions. These start and end times are correlated to the plug in and plug out times of the connected vehicle charger data 116 with a small tolerance. Depending on user behavior and communication time, charging start time by dynamic charger history 118 occurs after a short delay from the vehicle plug in time, and vehicle plug out time occurs after a short delay from charging end time by dynamic charger history 118. If a match is found in the EVSE records of one of the EVSEs 106 of the charging station 104, then that charge visit may be correlated to that EVSE 106 and added to the identified vehicle-charger visits 310. Otherwise, the charge visit is determined to be unknown and may be discarded from further processing in the workflow 300 by the charger service 126.

Continuing with the identified vehicle-charger visit 310, at operation 314 the charger service 126 merges back-to-back visits by the same vehicle 102 and EVSE 106. The back-to-back visits may be detected as consecutive EVSE 106 visits, e.g., within a predefined time window from one another, to the same EVSE 106 as identified from the previous step 310. The multiple visits occur when they failed to be grouped as one in 304, which may be caused by jittering of vehicle GNSS signals.

At operation 316, the set of visits is collected for further processing. In the collected set of visits, each charging event should have a single vehicle 102 location coordinate and be mapped to exactly one EVSE 106 at a single charging station 104. The output of this collection therefore includes the following attributes for each charging event: GNSS location of the vehicle 102, mapped ID of the charging station 104, and mapped ID of the EVSE 106. Using the collected set of identified vehicle-charger visits 310, the charger service 126 may determine the charging station locations 128 and the EVSE locations 130.

At operation 318, beginning with the EVSE locations 130, the charger service 126 filters the GNSS locations of the vehicles 102, the IDs of the charging stations 104, and the IDs of the EVSEs 106 to ensure that the EVSEs 106 to be located have at least a minimum number of visits. As noted above, multiple vehicle 102 visits may lead to more accurate EVSE locations 130. This implies that EVSE locations 130 may be unstable when the number of visits is too low. In an example, the charger service 126 may filter to require a minimum of four charge visits for estimating the location of the EVSE 106. It should be noted that this is only an example, and a different minimum threshold quantity of visits may be used.

At operation 320, the filtered identified vehicle-charger visits 310 are processed to remove outlier locations. The workflow 300 may generally assume that there is no systematic bias between measured GNSS locations of the vehicles 102 and true charging locations of the vehicles 102. In real-world scenarios however, GNSS locations may shift due to electronic or software defects, sometimes referred to as GNSS drift. This can result in noise and outlier locations, which are observed as individual outliers or small clusters of charge visits that are significantly distant from other visits (e.g., away from a major cluster).

To uphold the assumption of a lack of systemic issues in the data, and to assure quality output, the charger service 126 may use the DBSCAN algorithm to remove outliers and noise before calculating geospatial centroid. The DBSCAN algorithm scans the GNSS locations of the charge visits of the vehicles 102 to the EVSE 106, and creates a cluster for the visits based on inter-visit distance and minimum cluster size. Formally, DBSCAN may be defined as:

$$DBSCAN(\text{vehicle } GNSS \text{ location}, \epsilon, m)$$

Where:

- $\epsilon$ is the inter-visit distance from each visit to any other visit in the cluster; and
- m is the minimum number of visits required to construct a cluster.

In one non-limiting example of criteria to estimate EVSE locations 130, e may be set between 3-5 meters (e.g., depending on GNSS vehicle 102 deviations), m may be set to at least 3 visits, and/or the minimum number of visits to a station may be set to at least 4 visits.

Most of the time, DBSCAN algorithm may form a single cluster for each EVSE 106. In extreme cases, e.g., when multiple clusters are formed, the charger service 126 processes the cluster with most visits and drops the other clusters.

At operation 322, after applying the DBSCAN algorithm to filter to a single cluster per EVSE 106, the charger service 126 estimates the EVSE location 130 as the geospatial centroid of the main single cluster of visits. These centroids may be identified at operation 324 as the estimated EVSE locations 130.

At operation 326, continuing with the charging station location 128, the charger service 126 filters the GNSS locations of the vehicles 102 and the IDs of the charging stations 104 to ensure that the charging stations 104 to be located have at least a minimum number of visits. Here, the ID of the EVSE 106 may be dropped from the data input as being unnecessary. In an example, the number of visits may be different than the number of visits to the EVSEs 106 discussed with respect to operation 318. In an example, the minimum number of visits to a charging station 104 may be greater than the number required for each EVSE 106 of the charging stations 104, e.g., 15 visits minimum, as opposed to the 3 visit minimum per EVSE 106. This value is only an example but may serve to balance the greater quantity of visits to charging stations 104 vs each EVSE 106, prioritizing a more stable result, e.g., due to the likely greater amount of available data and also to account for the different possible EVSEs 106.

At operation 328, the filtered identified vehicle-charger visits 310 are processed to remove outlier locations. Similar to operation 320, DBSCAN may be applied to the filtered identified vehicle-charger visits 310 to remove outliers and/or secondary clusters smaller than the main cluster.

At operation 330, after applying the DBSCAN algorithm to filter to a single cluster per charging station 104, the charger service 126 estimates the charging station location 128 as the geospatial centroid of the main single cluster of visits. In one non-limiting example of criteria to estimate charging station locations 128, e may be set to 30 meters, m may be set to at least 3 visits, and/or the minimum number of visits to a station may be set to at least 15 visits. These centroids may be identified at operation 332 as the charging station locations 128.

The process of aggregating vehicle locations from charge visits to EVSE locations 130 may be visualized through the following case studies. Both case studies demonstrate that the charger service 126 generates accurate charging locations, proved by EVSE locations 130 falling within a parking spot when overlayed on satellite map. Both case studies also demonstrate robust performance at identifying and excluding noise and outlier in the identified vehicle-charger visits 310.

Figure 4:
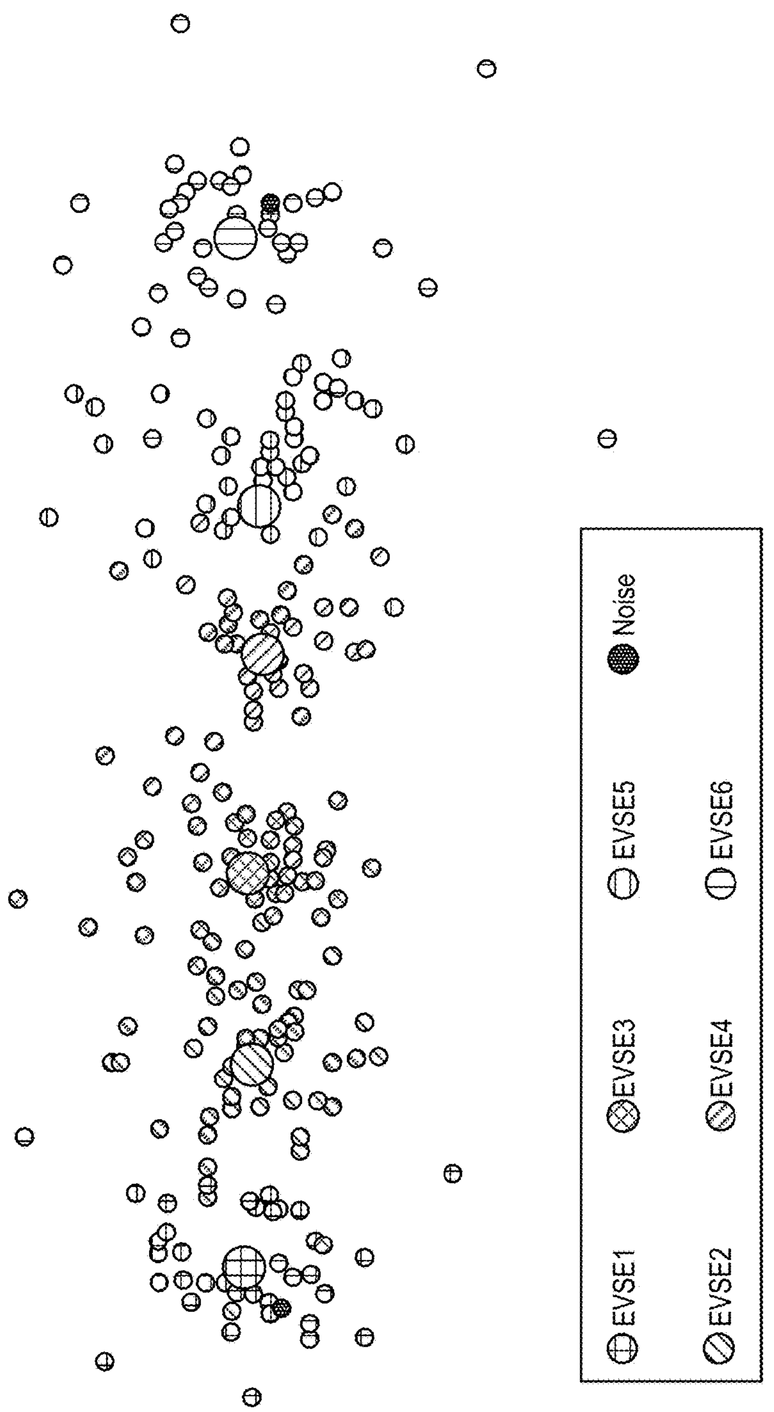
FIG. 4 illustrates an example clustering of EVSE locations in a first case study.

FIG. 4 illustrates an example clustering 400 of EVSE locations 130 in a first case study. As shown, six EVSE locations 130 are indicated for the EVSEs 106 shown in FIG. 2. In this example, the location of the charging station 104 from the charging station location data 122 so far away that it is off the scale to the right of the illustrated DBSCAN clusters. It should also be noted that certain locations are marked off as noise, as having exceeded the threshold from their respective main DBSCAN clusters.

Figure 5A:
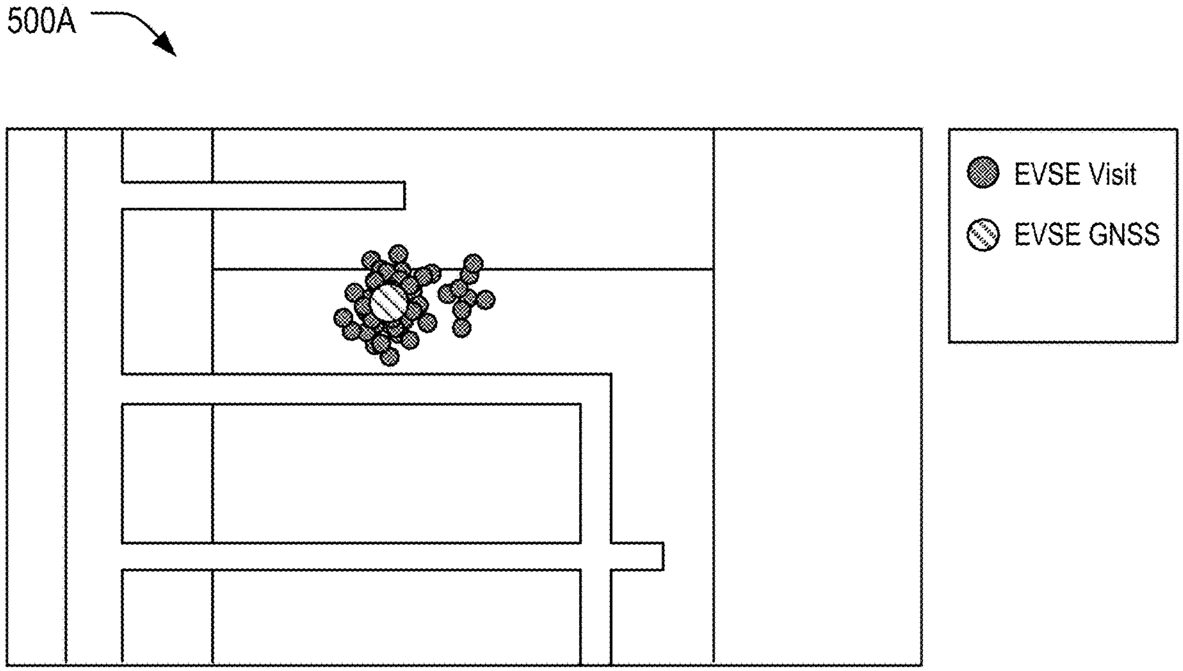
FIG. 5A illustrates a portion of a clustering of EVSE locations for a first EVSE of a charging station in a second case study.
Figure 5B:
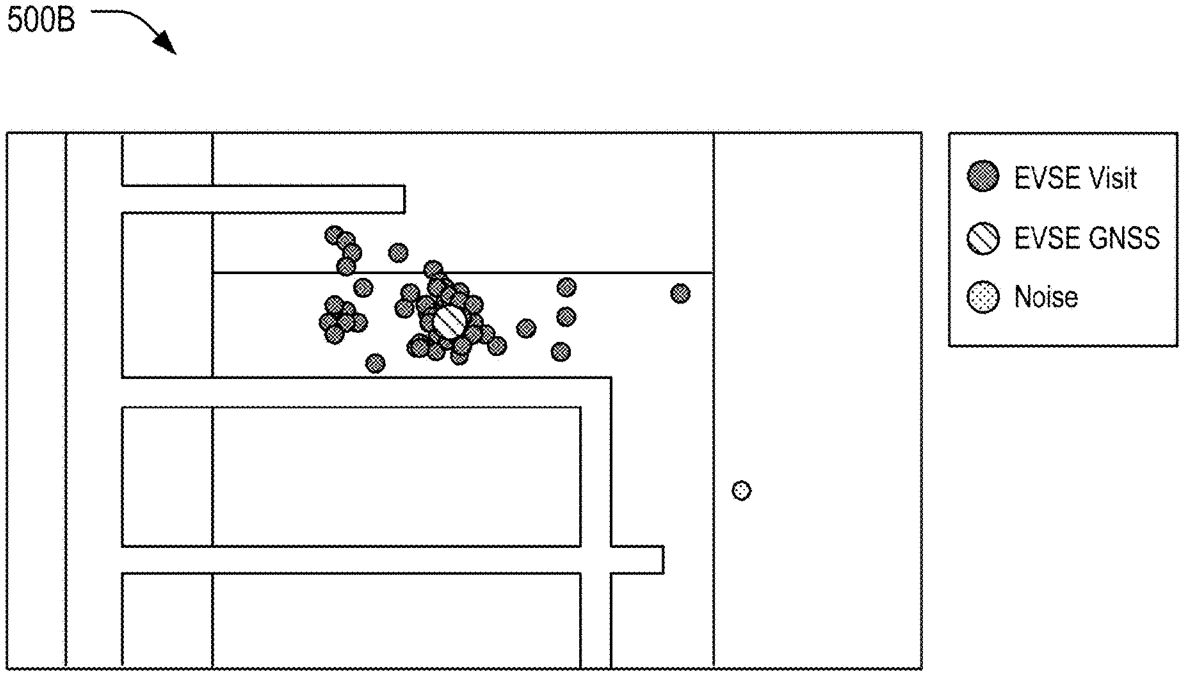
FIG. 5B illustrates a portion of a clustering of EVSE locations for a second EVSE of the charging station in the second case study.
Figure 5C:
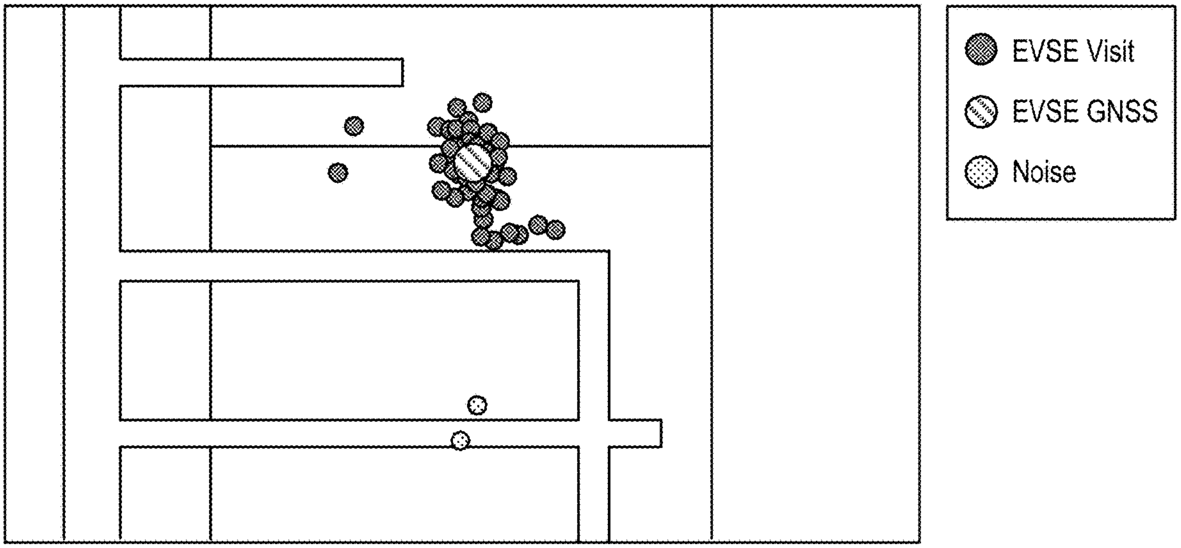
FIG. 5C illustrates a portion of a clustering of EVSE locations for a third EVSE of the charging station in the second case study.
Figure 5D:
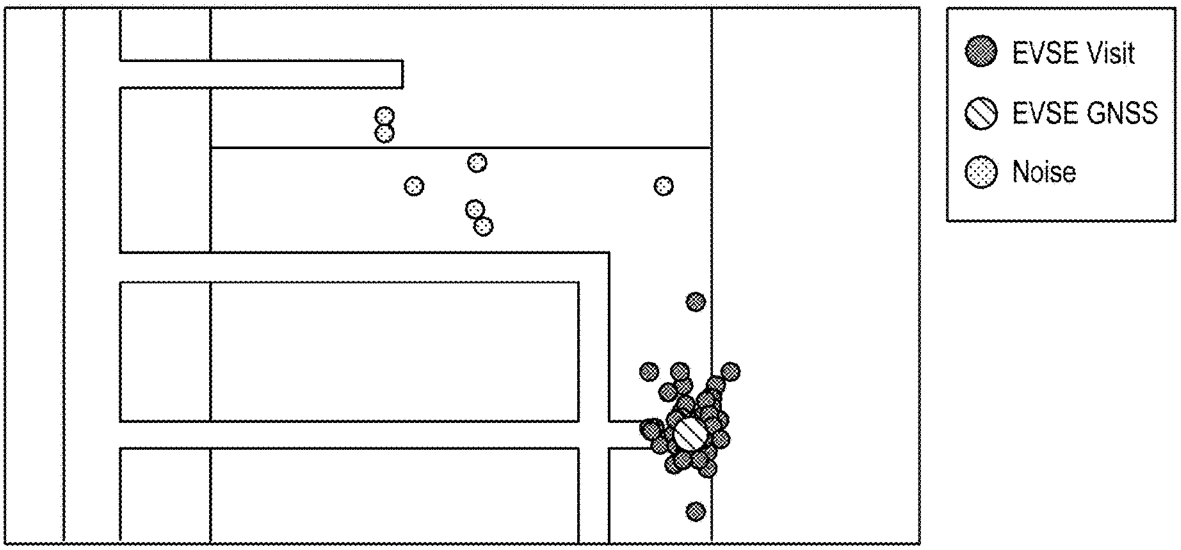
FIG. 5D illustrates a portion of a clustering of EVSE locations for a fourth EVSE of the charging station in the second case study.

FIGS. 5A-5D collectively illustrate an example clustering 500 of EVSE locations 130 in a second case study. FIG. 5A illustrates a portion of the clustering 500 for a first EVSE 106 of the charging station 104. FIG. 5B illustrates a portion of the clustering 500 for a second EVSE 106 of the charging station 104. FIG. 5C illustrates a portion of the clustering 500 for a third EVSE 106 of the charging station 104. FIG. 5D illustrates a portion of the clustering 500 for a fourth EVSE 106 of the charging station 104.

As shown in FIG. 5A, all of the identified vehicle-charger visits 310 are within a single cluster of the DBSCAN algorithm. Moreover, the estimated EVSE location 130 is marked as the centroid of the single identified cluster. As shown in FIG. 5B, most of the identified vehicle-charger visits 310 are within a single cluster, although there are removed identified vehicle-charger visits 310 that are deemed to be noise due because of exceeding E. As shown in FIG. 5C, again most of the identified vehicle-charger visits 310 are within a single cluster, although there are removed identified vehicle-charger visits 310 in a second cluster outside of E. As shown in FIG. 5D, despite the multiple clusters that are determined the EVSE location 130 is determined using only the largest of the clusters.

Figure 6:
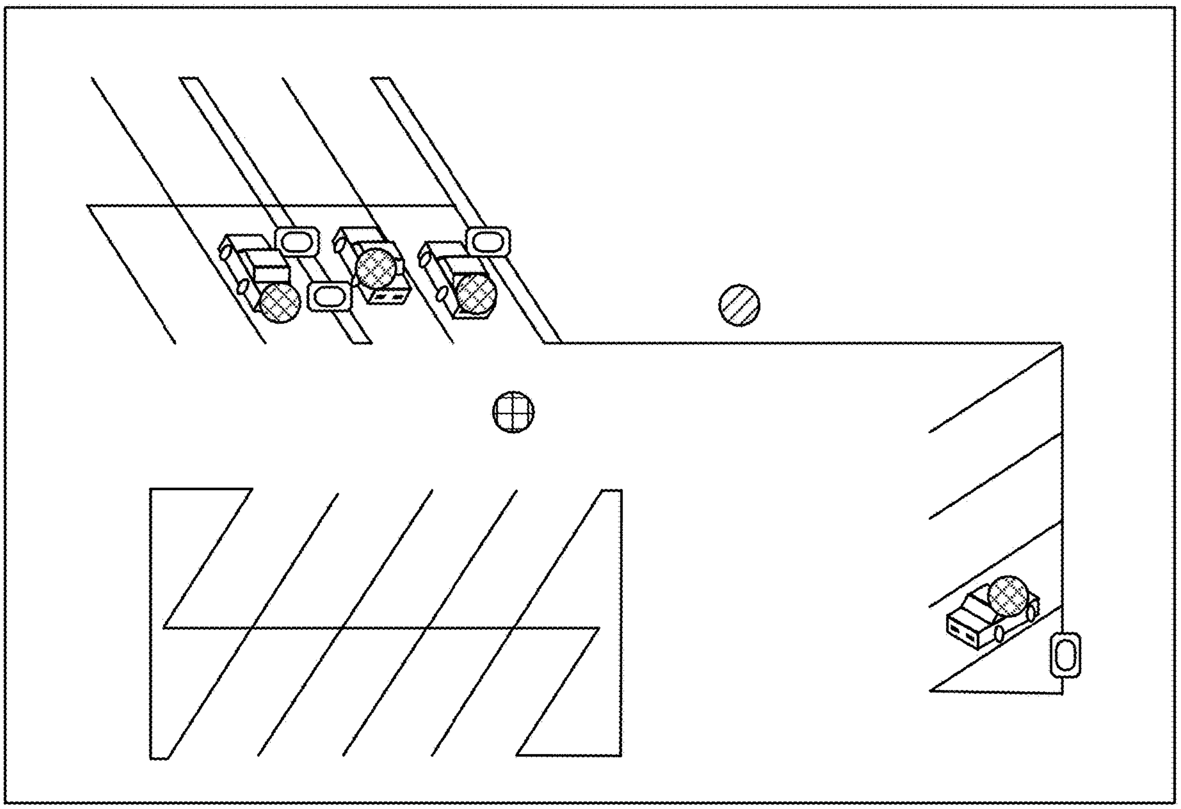
FIG. 6 illustrates an example map including the EVSE locations determined in the second case study.
Figure 6:
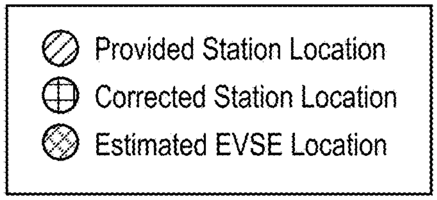

FIG. 6 illustrates an example map 600 including the EVSE locations 130 determined in the second case study. As can be seen, the approach provides good alignment with the actual EVSE locations 130.

Figure 7:
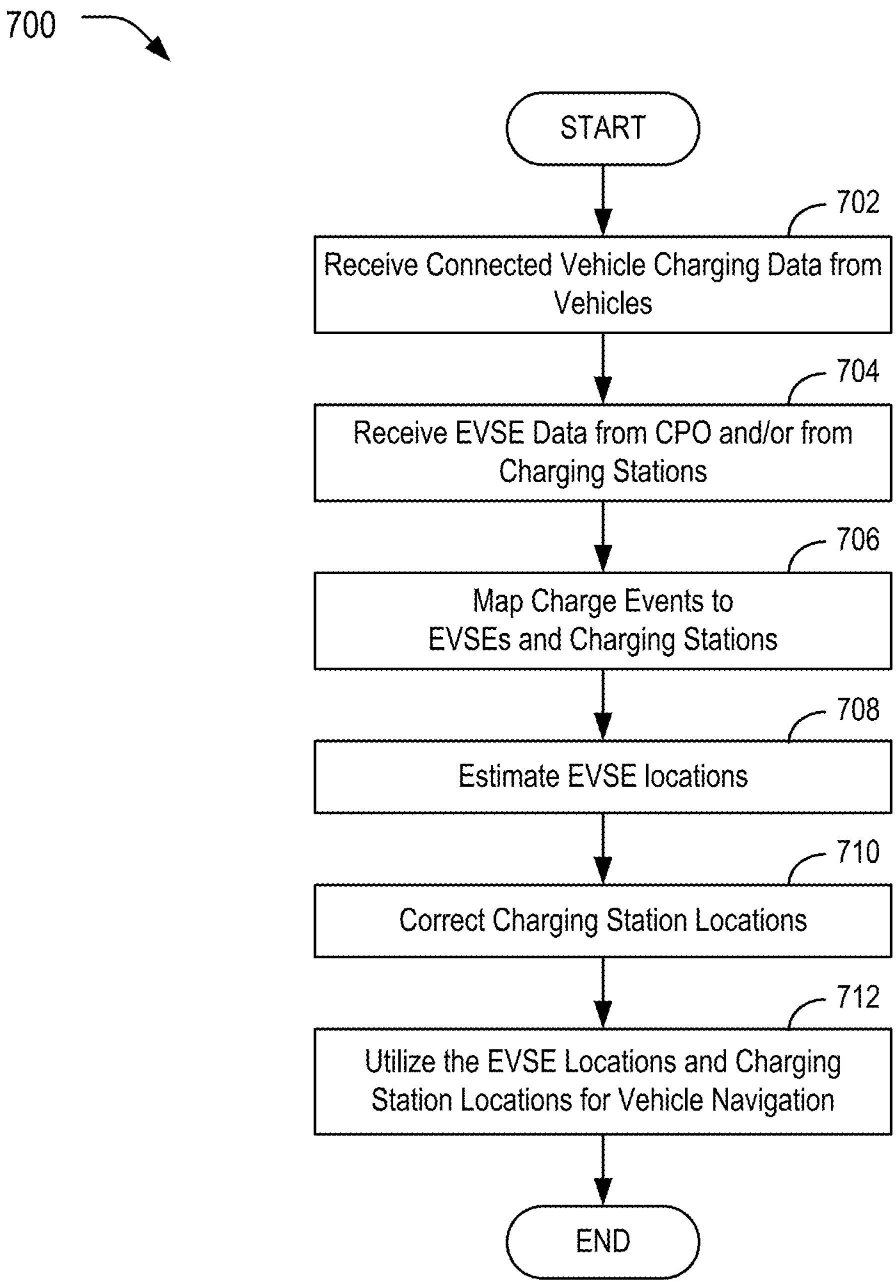
FIG. 7 illustrates an example process for accurate determination of charging station locations and EVSE locations using data-driven techniques.

FIG. 7 illustrates an example process 700 for accurate determination of charging station locations 128 and EVSE locations 130 using data-driven techniques. In an example, the process 700 may be performed by the charger service 126 in the context of the system 100, as discussed in detail herein.

At operation 702, the charger service 126 receives connected vehicle charger data 116 from a plurality of vehicles 102. The connected vehicle charger data 116 may include GNSS locations of the vehicles 102 during charging events, identifiers of the EVSEs 106 connected to the vehicles 102 during the charging events, and plug-in and plug-out times of the vehicles 102 connecting to the EVSEs 106 for the charging events. In an example, the connected vehicle charger data 116 is received to the charger monitoring server 114 over the communications network 110 from the vehicles 102.

At operation 704, the charger service 126 receives information about the EVSEs 106. In an example, dynamic charger history data 118 and/or charging station location data 122 is received to the charger monitoring server 114 over the communications network 110 from the CPO server 120. In another example, the dynamic charger history data 118 and/or charging station location data 122 may be received to the charger monitoring server 114 over the communications network 110 from the charging stations 104 and or the EVSEs 106 without using the CPO server 120 as an intermediary. The dynamic charger history data 118 may include the status of each of the EVSEs 106 over time and usage events of each of the EVSEs 106. The charging station location data 122 may include initial GNSS coordinates of charging stations 104.

At operation 706, the charger service 126 maps charge events in the connected vehicle charger data 116 to the EVSEs 106 and to the charging stations 104. In an example, the charger service 126 may perform the filtering, grouping, and matching, and merging discussed in detail with respect to operations 302-316 of the workflow 300. For instance, the charger service 126 may filter the connected vehicle charger data 116 to include only charging events within a predefined recent time window. In another example, the charger service 126 may map the charging events to the EVSEs 106 of the charging station 104 using an EVSE-to-MAC address mapping and the EVSE 106 identifiers of EVSEs 106 connected to the vehicles 102 during the charging events. In yet another example, for the charging events that do not map to the EVSEs 106 using the EVSE-to-MAC address mapping, the charger service 126 may map the charging events to the EVSEs 106 by matching the status of the EVSE 106 over time to the plug-in and plug-out times of the charging events. In still another example, the charger service 126 may map the charging events to the charging station 104 using the vehicle 102 GNSS locations within a predefined distance from the initial GNSS coordinates of charging stations 104.

At operation 708, the charger service 126 estimates the EVSE locations 130. In an example, the charger service 126 may perform the filtering, DBSCAN, clustering and identifying discussed in detail with respect to operations 318-324 of the workflow 300. This may include, for example, performing a clustering of the GNSS locations of the vehicles 102 for the charging events mapped to the EVSEs 106 using the DBSCAN algorithm and discarding any GNSS locations identified as outliers by the DBSCAN algorithm before calculating the centroids of the EVSEs 106. In some examples, a minimum threshold number of charge events for the EVSE 106 is required for estimating the associated EVSE location 130.

At operation 710, the charger service 126 corrects the charging station location data 122 to determine the charging station locations 128, In an example, the charger service 126 may perform the filtering, DBSCAN, clustering and identifying discussed in detail with respect to operations 326-332 of the workflow 300. This may include, for example, performing a clustering of the GNSS locations of the vehicles 102 for the charging events mapped to the charging stations 104 using the DBSCAN algorithm and discarding any GNSS locations identified as outliers by the DBSCAN algorithm before calculating the centroids of the charging stations 104. In some examples, a minimum threshold number of charge events for the charging station 104 is required for estimating the associated charging station location 128.

At operation 712, the charger service 126 utilizes the EVSE locations 130 and the charging station locations 128 for navigation of the vehicle 102. In an example, the charger service 126 may receive a charger request 134 from a vehicle 102 including a location and/or destination of the vehicle 102 and may send a charger recommendation 136 to the vehicle 102, the charger recommendation 136 including a recommended charging station location 128 of one of the charging stations 104 and a recommended EVSE location 130 of a recommended one of the EVSEs 106. After operation 712, the process 700 ends.

Figure 8:
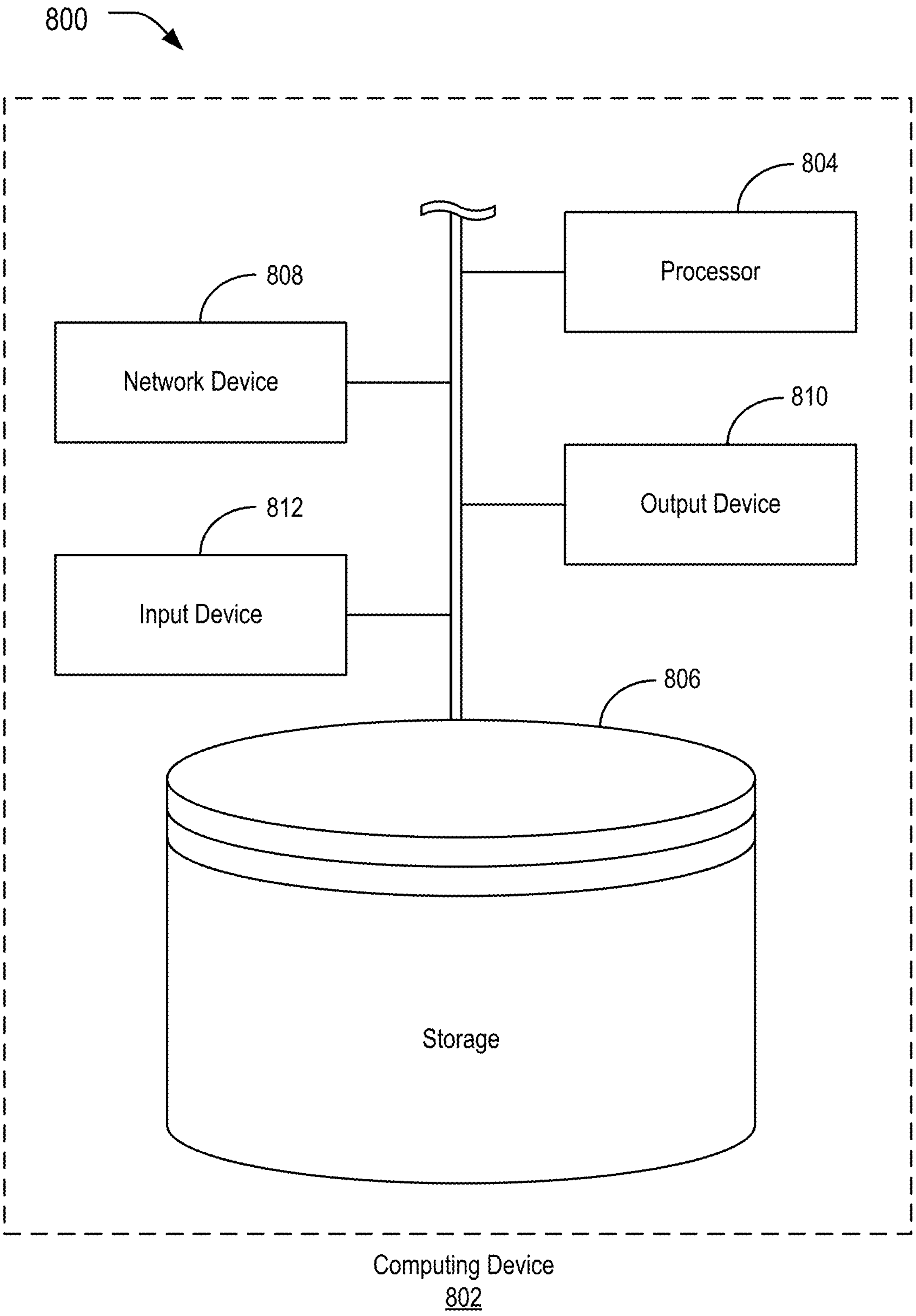
FIG. 8 illustrates an example computing device for implementing aspects of vehicles navigating to charging stations and EVSEs.

FIG. 8 illustrates an example computing device 802 for implementing aspects of vehicles 102 navigating to charging stations and EVSEs 106. Referring to FIG. 8, and with reference to FIGS. 1-7, the vehicle 102, charging stations 104, EVSEs 106, mobile devices 108, communications network 110, TCU 112, charger monitoring server 114, and CPO server 120 may include examples of such computing devices 802. Computing devices 802 generally include computer-executable instructions, where the instructions may be executable by one or more computing devices 802. Computer-executable instructions may be compiled or interpreted from computer programs created using a variety of programming languages and/or technologies, including, without limitation, and either alone or in combination, Java™, C, C++, C#, Visual Basic, Python, Perl, etc. In general, a processor (e.g., a microprocessor) receives instructions, e.g., from a memory, a computer-readable medium, etc., and executes these instructions, thereby performing one or more processes, including one or more of the processes described herein. Such instructions, such as those of the charger service 126, and other data, such as the connected vehicle charger data 116, dynamic charger history data 118, charging station location data 122, EVSE-MAC mapping 124, charging station locations 128, charger requests 134, and charger recommendations 136, may be stored and transmitted using a variety of computer-readable media.

As shown, the computing device 802 may include a processor 804 that is operatively connected to a storage 806, a network device 808, an output device 810, and an input device 812. It should be noted that this is merely an example, and computing devices 802 with more, fewer, or different components may be used.

The processor 804 may include one or more integrated circuits that implement the functionality of a central processing unit (CPU) and/or graphics processing unit (GPU). In some examples, the processors 804 are a system on a chip (SoC) that integrates the functionality of the CPU and GPU. The SoC may optionally include other components such as, for example, the storage 806 and the network device 808 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 804 executes stored program instructions that are retrieved from the storage 806. The stored program instructions, accordingly, include software that controls the operation of the processors 804 to perform the operations described herein. The storage 806 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 810. The output device 810 may include a graphical or visual display device, such as an electronic display screen, projector, printer, or any other suitable device that reproduces a graphical display. As another example, the output device 810 may include an audio device, such as a loudspeaker or headphone. As yet a further example, the output device 810 may include a tactile device, such as a mechanically raiseable device that may, in an example, be configured to display braille or another physical output that may be touched to provide information to a user.

The input device 812 may include any of various devices that enable the computing device 802 to receive control input from users. Examples of suitable input devices 812 that receive human interface inputs may include keyboards, mice, trackballs, touchscreens, microphones, graphics tablets, and the like.

The network devices 808 may each include any of various devices that enable the described components to send and/or receive data from external devices over networks. Examples of suitable network devices 808 include an Ethernet interface, a Wi-Fi transceiver, a cellular transceiver, or a BLUETOOTH or BLE transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method for determining precise geographic locations of electric vehicle supply equipment (EVSE) at charging stations, the method comprising:

receiving connected vehicle charger data from a plurality of vehicles, the connected vehicle charger data including vehicle global navigation satellite system (GNSS) locations during charging events, EVSE identifiers of EVSEs connected to the vehicles during the charging events, and plug-in and plug-out times of the charging events;

mapping the charging events to the EVSEs of the charging stations;

for each of the EVSEs, extracting EVSE locations as EVSE centroids of clustered vehicle GNSS locations of the charging events mapped to the EVSE;

for each of the charging stations, extracting corrected charging station locations as charging station centroids of clustered vehicle GNSS locations for each charging station; and providing the corrected charging station locations and the EVSE locations for use in vehicle navigation.

2. The method of claim 1, further comprising:

mapping the charging events to the EVSEs of the charging station using an EVSE-to-MAC address mapping and the EVSE identifiers of EVSEs connected to the vehicles during the charging events;

receiving dynamic charger history data for a plurality of EVSEs, the dynamic charger history data including status of each of the EVSEs over time and usage events of each of the EVSEs; and for the charging events that do not map to the EVSEs using the EVSE-to-MAC address mapping, mapping the charging events to the EVSEs by matching the status of the EVSE over time to the plug-in and plug-out times of the charging events.

3. The method of claim 1, further comprising:

receiving charging station location data including initial GNSS coordinates of charging stations; and mapping the charging events to the charging station using the vehicle GNSS locations within a predefined distance from the initial GNSS coordinates of charging stations.

4. The method of claim 1, further comprising:

performing a first clustering the vehicle GNSS locations of the charging events mapped to the EVSE using a density-based spatial clustering of applications with noise (DBSCAN) algorithm;

performing a second clustering the vehicle GNSS locations of the charging events mapped to the charging station using the DBSCAN algorithm; and discarding any vehicle GNSS locations identified as outliers by the DBSCAN algorithm before calculating the EVSE centroids and the charging station centroids.

5. The method of claim 4, wherein a first minimum threshold number of charge events is required for estimating each EVSE location, and a second minimum threshold number of charge events is required for estimating each charging station location.

6. The method of claim 4, further comprising filtering the connected vehicle charger data to include only charging events within a predefined recent time window prior to performing the first and second clusterings.

7. The method of claim 1, further comprising merging consecutive charging sessions by a same vehicle at a same EVSE prior to clustering.

8. The method of claim 1, further comprising:

receiving a charger request from a vehicle including a location and/or destination of the vehicle; and sending a charger recommendation to the vehicle, the charger recommendation including a recommended charging station location of one of the charging stations and a recommended EVSE location of a recommended one of the EVSEs.

9. The system of claim 1, wherein the memory is further configured to store dynamic charger history data for a plurality of EVSEs, the dynamic charger history data including status of each of the EVSEs over time and usage events of each of the EVSEs; and wherein one or more one or more processors are further configured to:

map the charging events to the EVSEs of the charging station using an EVSE-to-MAC address mapping and the EVSE identifiers of EVSEs connected to the vehicles during the charging events; and for the charging events that do not map to the EVSEs using the EVSE-to-MAC address mapping, map the charging events to the EVSEs by matching the status of the EVSE over time to the plug-in and plug-out times of the charging events.

10. The system of claim 1, wherein the memory is further configured to store charging station location data including initial GNSS coordinates of charging stations; and wherein one or more one or more processors are further configured to map the charging events to the charging station using the vehicle GNSS locations within a predefined distance from the initial GNSS coordinates of charging stations.

11. The system of claim 1, wherein the one or more processors are further configured to merge consecutive charging sessions by a same vehicle at a same EVSE prior to clustering.

12. A system for determining precise geographic locations of electric vehicle supply equipment (EVSE) at charging stations, the method comprising:

a memory configured to store connected vehicle charger data from a plurality of vehicles, the connected vehicle charger data including vehicle global navigation satellite system (GNSS) locations during charging events, EVSE identifiers of EVSEs connected to the vehicles during the charging events, and plug-in and plug-out times of the charging events; and one or more processors, configured to:

map the charging events to the EVSEs of the charging stations, for each of the EVSEs, extract EVSE locations as EVSE centroids of clustered vehicle GNSS locations of the charging events mapped to the EVSE, for each of the charging stations, extract corrected charging station locations as charging station centroids of clustered vehicle GNSS locations for each charging station, and provide the corrected charging station locations and the EVSE locations for use in vehicle navigation.

13. The system of claim 12, wherein the one or more processors are further configured to:

perform a first clustering the vehicle GNSS locations of the charging events mapped to the EVSE using a density-based spatial clustering of applications with noise (DBSCAN) algorithm;

perform a second clustering the vehicle GNSS locations of the charging events mapped to the charging station using the DBSCAN algorithm; and discarding any vehicle GNSS locations identified as outliers by the DBSCAN algorithm before calculating the EVSE centroids and the charging station centroids.

14. The system of claim 13, wherein a first minimum threshold number of charge events is required for estimating each EVSE location, and a second minimum threshold number of charge events is required for estimating each charging station location.

15. The system of claim 13, wherein the one or more processors are further configured to filter the connected vehicle charger data to include only charging events within a predefined recent time window prior to performing the first and second clusterings.

16. The system of claim 12, wherein the one or more processors are further configured to:

receive a charger request from a vehicle including a location and/or destination of the vehicle; and send a charger recommendation to the vehicle, the charger recommendation including a recommended charging station location of one of the charging stations and a recommended EVSE location of a recommended one of the EVSEs.

17. A non-transitory computer-readable medium comprising instructions for determining precise geographic locations of electric vehicle supply equipment (EVSE) at charging stations that, when executed by one or more processors, causes the one or more processors to perform operations including to:

receive connected vehicle charger data from a plurality of vehicles, the connected vehicle charger data including vehicle global navigation satellite system (GNSS) locations during charging events, EVSE identifiers of EVSEs connected to the vehicles during the charging events, and plug-in and plug-out times of the charging events;

map the charging events to the EVSEs of the charging stations;

for each of the EVSEs, extract EVSE locations as EVSE centroids of clustered vehicle GNSS locations of the charging events mapped to the EVSE;

for each of the charging stations, extract corrected charging station locations as charging station centroids of clustered vehicle GNSS locations for each charging station; and provide the corrected charging station locations and the EVSE locations for use in vehicle navigation.

18. The non-transitory computer-readable medium of claim 17, further comprising instructions that, when executed by the one or more processors, causes the one or more processors to perform operations including to:

map the charging events to the EVSEs of the charging station using an EVSE-to-MAC address mapping and the EVSE identifiers of EVSEs connected to the vehicles during the charging events;

receive dynamic charger history data for a plurality of EVSEs, the dynamic charger history data including status of each of the EVSEs over time and usage events of each of the EVSEs;

for the charging events that do not map to the EVSEs using the EVSE-to-MAC address mapping, mapping the charging events to the EVSEs by matching the status of the EVSE over time to the plug-in and plug-out times of the charging events;

receive charging station location data including initial GNSS coordinates of charging stations; and map the charging events to the charging station using the vehicle GNSS locations within a predefined distance from the initial GNSS coordinates of charging stations.

19. The non-transitory computer-readable medium of claim 17, further comprising instructions that, when executed by the one or more processors, causes the one or more processors to perform operations including to:

perform a first clustering the vehicle GNSS locations of the charging events mapped to the EVSE using a density-based spatial clustering of applications with noise (DBSCAN) algorithm;

perform a second clustering the vehicle GNSS locations of the charging events mapped to the charging station using the DBSCAN algorithm; and discard any vehicle GNSS locations identified as outliers by the DBSCAN algorithm before calculating the EVSE centroids and the charging station centroids, wherein a first minimum threshold number of charge events is required for estimating each EVSE location, and a second minimum threshold number of charge events is required for estimating each charging station location.

20. The non-transitory computer-readable medium of claim 17, further comprising instructions that, when executed by the one or more processors, causes the one or more processors to perform operations including to:

receive a charger request from a vehicle including a location and/or destination of the vehicle; and send a charger recommendation to the vehicle, the charger recommendation including a recommended charging station location of one of the charging stations and a recommended EVSE location of a recommended one of the EVSEs.

* * * * *